United States Patent
Chen et al.

(10) Patent No.: US 10,949,102 B2
(45) Date of Patent: Mar. 16, 2021

(54) LEVERAGING SNAPSHOT FOR TIME SERIES PATTERN ANALYSIS PREDICTION

(71) Applicant: EMC IP Holding Company LLC, Hopkinton, MA (US)

(72) Inventors: Xiangping Chen, Sherborn, MA (US); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 16/164,005

(22) Filed: Oct. 18, 2018

(65) Prior Publication Data
US 2020/0125280 A1 Apr. 23, 2020

(51) Int. Cl.
| G06F 3/06 | (2006.01) |
| G06F 9/50 | (2006.01) |
| G06F 11/34 | (2006.01) |
| G06N 99/00 | (2019.01) |
| G06N 20/00 | (2019.01) |

(52) U.S. Cl.
CPC .......... *G06F 3/0631* (2013.01); *G06F 3/0607* (2013.01); *G06F 3/067* (2013.01); *G06F 3/0653* (2013.01); *G06F 9/505* (2013.01); *G06F 11/3414* (2013.01); *G06N 20/00* (2019.01); *G06F 2201/84* (2013.01); *G06F 2209/5019* (2013.01)

(58) Field of Classification Search
CPC ...... G06F 3/067; G06F 3/0653; G06F 3/0607; G06F 11/3414; G06F 3/0631; G06F 9/505; G06N 20/00
USPC ........................................................ 711/170
See application file for complete search history.

(56) References Cited

U.S. PATENT DOCUMENTS

| 7,475,124 | B2 | 1/2009 | Jiang et al. |
| 7,886,119 | B1 * | 2/2011 | Cameron .............. G06F 3/0611 711/162 |
| 8,327,103 | B1 | 12/2012 | Can et al. |
| 8,380,928 | B1 | 2/2013 | Chen et al. |
| 8,429,346 | B1 | 4/2013 | Chen et al. |

(Continued)

OTHER PUBLICATIONS

U.S. Appl. No. 16/048,767, filed Jul. 30, 2018, Chen et al.

(Continued)

*Primary Examiner* — Tuan V Thai
*Assistant Examiner* — Edward Waddy, Jr.
(74) *Attorney, Agent, or Firm* — Daly, Crowley Mofford & Durkee, LLP

(57) ABSTRACT

A method is disclosed comprising: generating a plurality of snapshots, each of the snapshots representing a state of one or more storage objects in a storage system; generating a plurality of access pattern records (APRs) for the storage objects, each APR being associated with a different respective one of the plurality of snapshots, each APR indicating a characteristic of workload of the storage system in a period preceding the generation of the APR's associated snapshot; detecting a workload trend for the storage objects, the workload trend being detected by using a workload prediction model that is trained based on the plurality of APRs; and configuring the storage system based on the workload trend, the configuring including allocating additional resources for servicing access requests to the storage objects when the workload trend is a rising workload trend.

17 Claims, 10 Drawing Sheets

(56) References Cited

U.S. PATENT DOCUMENTS

| | | |
|---|---|---|
| 8,515,911 B1 | 8/2013 | Zhou et al. |
| 8,539,148 B1 | 9/2013 | Chen et al. |
| 8,566,483 B1 | 10/2013 | Chen et al. |
| 8,583,607 B1 | 11/2013 | Chen et al. |
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,304,889 B1 | 4/2016 | Chen et al. |
| 9,348,830 B2 * | 5/2016 | Montulli .............. G06F 16/178 |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,469,330 B1 * | 11/2019 | Roth .................... H04L 41/5003 |
| 10,496,288 B1 * | 12/2019 | Morley ................. G06F 3/0647 |
| 2014/0249927 A1 * | 9/2014 | De Angelo ........ G06Q 30/0269 |
| | | 705/14.64 |
| 2016/0110268 A1 * | 4/2016 | Sekiguchi ........... G06F 11/1469 |
| | | 714/15 |
| 2018/0013692 A1 * | 1/2018 | Park ....................... H04L 67/22 |
| 2018/0113640 A1 * | 4/2018 | Fernandez .............. G06F 3/061 |

OTHER PUBLICATIONS

U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.

* cited by examiner

LEVERAGING SNAPSHOT FOR TIME SERIES PATTERN ANALYSIS PREDICTION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: generating a plurality of snapshots, each of the snapshots representing a state of one or more storage objects in a storage system; generating a plurality of access pattern records (APRs) for the storage objects, each APR being associated with a different respective one of the plurality of snapshots, each APR indicating a characteristic of workload of the storage system in a period preceding the generation of the APR's associated snapshot; detecting a workload trend for the storage objects, the workload trend being detected by using a workload prediction model that is trained based on the plurality of APRs; and configuring the storage system based on the workload trend, the configuring including allocating additional resources for servicing access requests to the storage objects when the workload trend is a rising workload trend.

According to aspects of the disclosure, a system is disclosed, comprising: a memory; and at least one processor operatively coupled to the memory, the at least one processor being configured to perform the operations of: generating a plurality of snapshots, each of the snapshots representing a state of one or more storage objects in a storage system; generating a plurality of access pattern records (APRs) for the storage objects, each APR being associated with a different respective one of the plurality of snapshots, each APR indicating a characteristic of workload of the storage system in a period preceding the generation of the APR's associated snapshot; detecting a workload trend for the storage objects, the workload trend being detected by using a workload prediction model that is trained based on the plurality of APRs; and configuring the storage system based on the workload trend, the configuring including allocating additional resources for servicing access requests to the storage objects when the workload trend is a rising workload trend.

According to aspects of the disclosure, a non-transitory computer-readable medium is provided that stores one or more processor-executable instructions, which when executed by at least one processor cause the at least one processor to perform the operations of: generating a plurality of snapshots, each of the snapshots representing a state of one or more storage objects in a storage system; generating a plurality of access pattern records (APRs) for the storage objects, each APR being associated with a different respective one of the plurality of snapshots, each APR indicating a characteristic of workload of the storage system in a period preceding the generation of the APR's associated snapshot; detecting a workload trend for the storage objects, the workload trend being detected by using a workload prediction model that is trained based on the plurality of APRs; and configuring the storage system based on the workload trend, the configuring including allocating additional resources for servicing access requests to the storage objects when the workload trend is a rising workload trend.

BRIEF DESCRIPTION OF nm DRAWING FIGURES

Other aspects, features, and advantages of the claimed invention will become more fully apparent from the following detailed description, the appended claims, and the accompanying drawings in Which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an 110 request may refer to a data read or write request.

Figure 1:
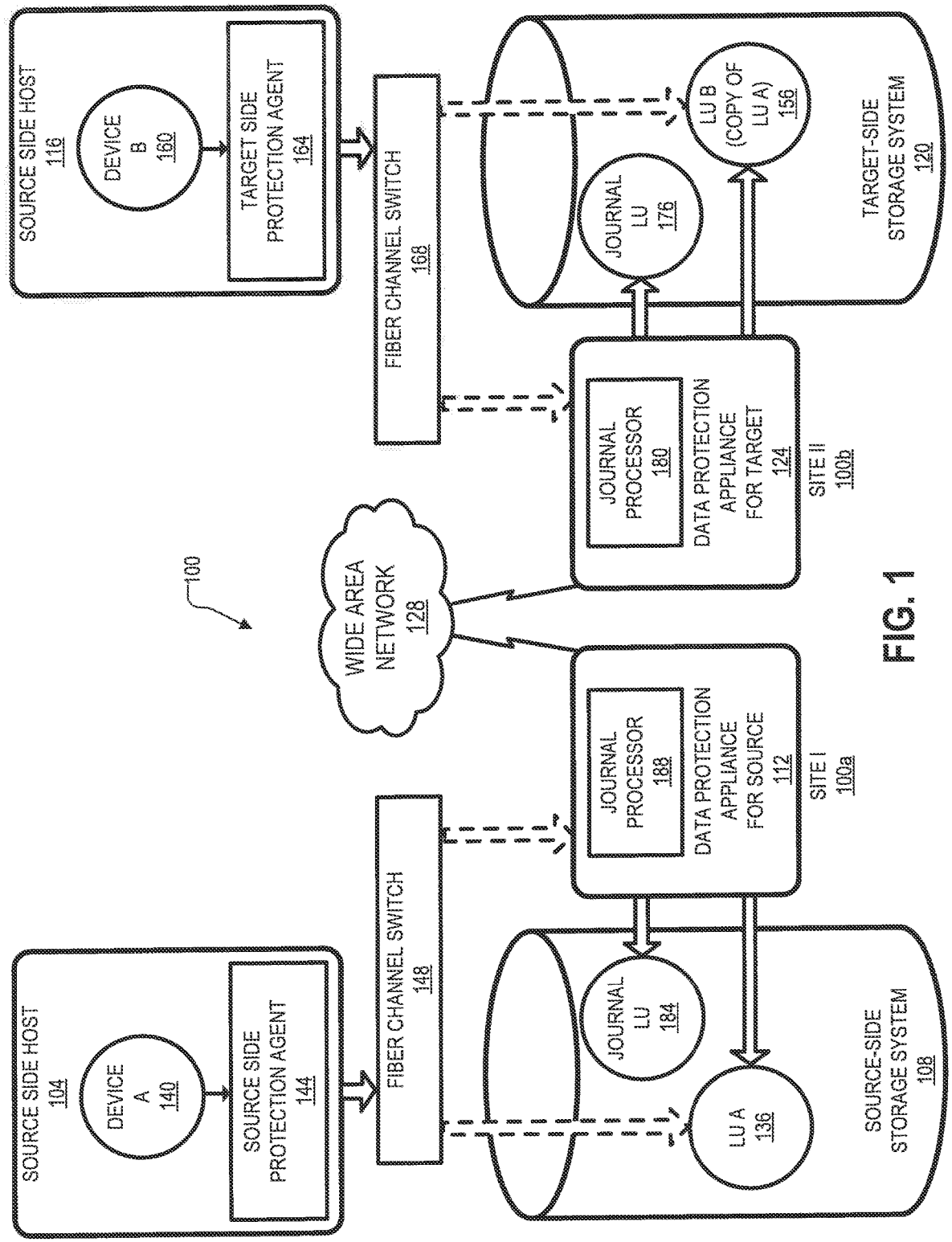
FIG. 1 is a diagram of an example of a distributed storage system, according to aspects of the disclosure.

Referring to the embodiment of FIG. 1, the storage system 100 includes two sites: Site I 100a and Site II 100b. Under normal operation Site I 100a may correspond to a source side (i.e., the transmitter within a data replication workflow)

of storage system 100 and Site II 100b may be the target side (i.e., the receiver within a data replication workflow) of the system, as shown in FIG. 1. Thus, during normal operations, the direction of replicate data flow may go from Site I 100a to Site II 100b.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN) 128, such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication, links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU is a physical or virtual logical entity provided by a storage system for accessing data stored therein. In some embodiments, an LU may be a virtual disk accessed by a virtual machine. In certain embodiments, an LU may be identified by a unique logical unit number (LUN).

In the embodiment of FIG. 1, storage system 108 exposes a logical unit 136, designated as LU A, and storage system 120 exposes a logical unit 136, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access an LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 156 ("LU A"). In some embodiments, the 110 requests include SCSI commands. In many embodiments, an 110 request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs, Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA, behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. Alternatively, a protection agent may also be located in a fiber channel switch, or in any other device situated in a data path between a host and a storage system or on the storage system itself In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." A journal may be used to provide access to storage at specified points in time, as discussed further below in conjunction with FIG. 2. In some embodiments, the journal may be stored across multiple LUs (e.g., using striping).

In some embodiments of FIG. 1, the source DPA 112 includes a journal processor 188 for managing a journal within LU 186 and the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 may be configured to perform processing described in the patent titled "METHODS AND APPARATUS FOR OPTIMAL JOURNALING FOR CONTINUOUS DATA REPLICATION" and with. U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network-based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a vane of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each 110 request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send 110 requests to LU B. To prevent such 110 requests from being sent, protection agent 164 may act as a target side protection agent for host device B 160 and may fail 110 requests sent from host 116 to LU B 156 through host device B 160.

Still referring to FIG. 1, in recovery mode, the target DPA 124 may undo the write transactions M the journal LU 176 so as to restore the target storage system 120 to an earlier state.

Figure 2:
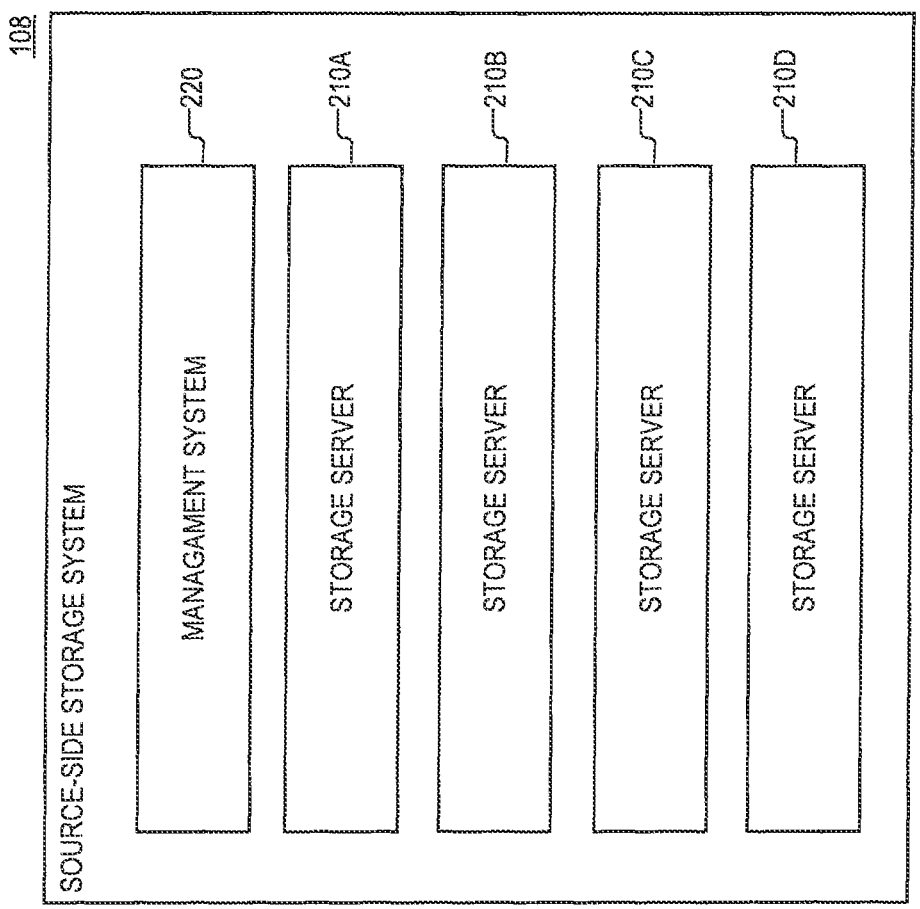
FIG. 2 is a diagram of an example of a source side storage system that is part of the distributed storage system of FIG. 1, according to aspects of the disclosure.

FIG. 2 is a diagram of the storage system 108, according to aspects of the disclosure. The system 108 may include a plurality of storage servers 210 and a management system 220 that are coupled to one another in a network (e.g, a mesh network). The network may include an InfiniBand network, a TCP/IP network, and/or any other suitable type of network. As is discussed further below each of the storage servers 210 may include a multi-core processor that is running a BLOCK software stack on one of its cores. The BLOCK software stack may be configured to instantiate 110 service processes, which are sometimes also referred as a TRUCK processes, on at least some of the remaining cores of the multi-core processor. As is further discussed below, each I/O service process may include any suitable type of process that is configured to execute (either partially or fully) incoming I/O requests, as well as perform additional operations related to data storage and retrieval.

Figure 3B:
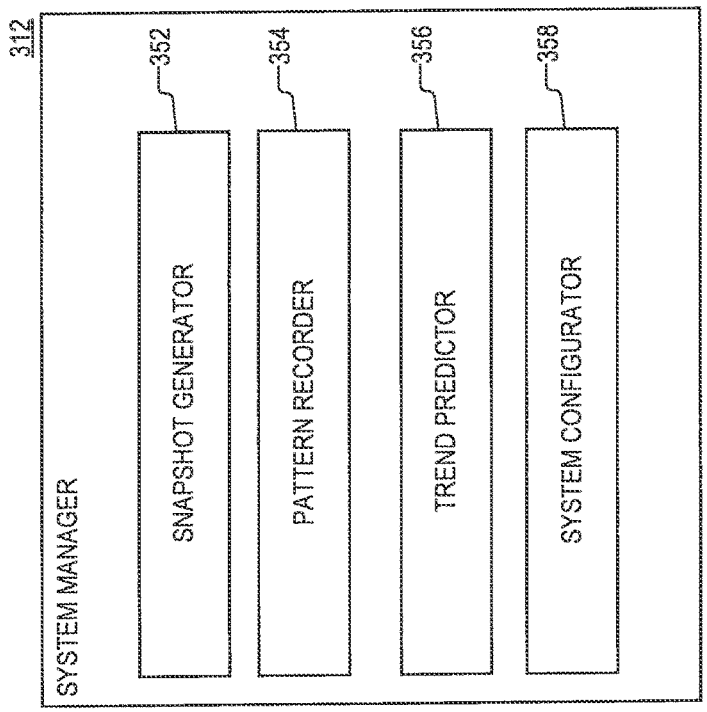
FIG. 3B is a diagram of an example of a system manager that is implemented by the management system of FIG. 3A.
Figure 3A:
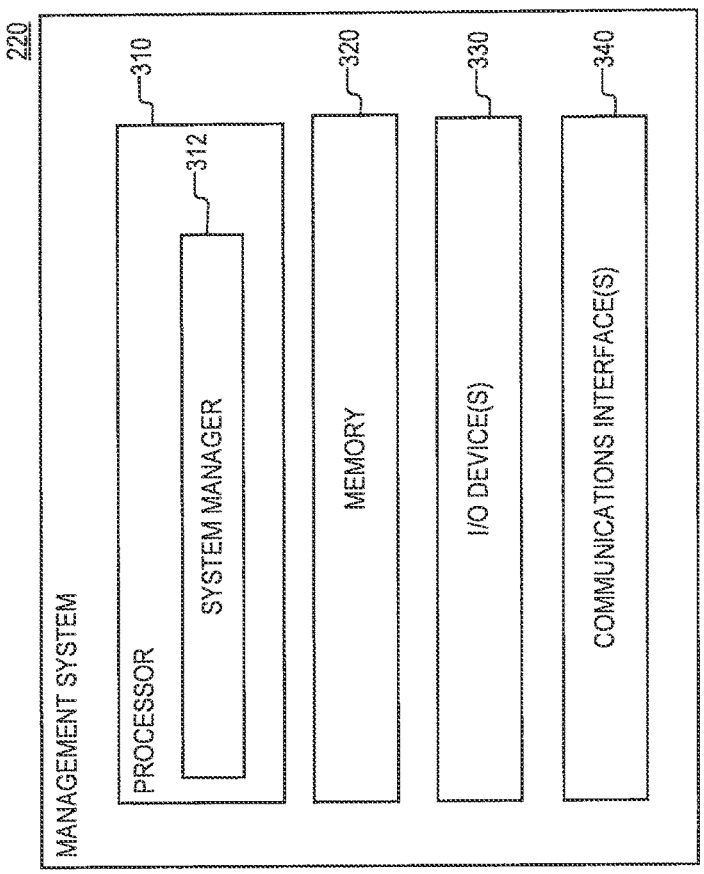
FIG. 3A is a diagram of an example of a management system that is part of the source side storage system of FIG. 2, according to aspects of the disclosure.

FIG. 3A is a diagram of an example of the management system 220, according to aspects of the disclosure. As illustrated, the management system 220 may include one or more processors 310, a memory 320, I/O device(s) 330, and communications interface(s) 340 that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 330 may include any suitable type of input and/or output device, such as one or more mice, one or more keyboards, one or more microphones, or one more display screens, for example. The communications interface(s) 340 may include any suitable type of communications interface, such as one or more Ethernet adapters, one or more Wi-Fi adapters (e.g., 802.1414 adapters), and one or more Long-Term Evolution (LTE) adapters, for example.

In some implementations, the management system 220 may be configured to execute a system manager 312. The system manager 312 may include one or more processes that are configured to manage the operation of the storage system 108. For example, the system manager 312 may be configured to: (i) control the generation of snapshots within the storage system 108, (ii) control the replication of data within the storage system, and (iii) institute various policies that bear on the distribution of system resources (e.g., physical storage space, network bandwidth, processor time, etc.) among different processes that are executed by the storage system 108. Although in the present example the system manager 312 is implemented in software, alternative implementations are possible in which the system manager is implemented in hardware or as a combination of software and hardware.

In some implementations, the system manager 312 may be configured to proactively adjust the configuration of the storage system 108 based on predictions about expected workload that are produced by a machine learning model. More particularly, the system manager 312 may be configured to collect access pattern records (APRs) and train the machine learning model based on the records. The machine learning model may be arranged to predict whether the workload on the storage system 108 will increase or decrease. When the workload on the storage system 108 is expected to increase (e.g., by the machine learning model), the system manager 312 may redistribute system resources to accommodate the increased workload. By contrast, when the workload on the storage system 108 is expected to decrease (e.g., by the machine learning model), the system manager 312 may redistribute the resources of the storage system 108 to free up any resources that are not going to be utilized efficiently under the current configuration of the storage system 108.

By employing machine learning capabilities, the system manager 312 may address some of the complexities of large-scale storage systems, which make such systems difficult for system administrators to configure by hand. Moreover, by employing machine learning capabilities, the system manager 312 may detect and respond to access pattern shifts that are associated with seasonal activities of customers. For example, financial departments often experience bursts of traffic at the end of month or quarter, and retail departments can often exhibit bursts in traffic during holiday seasons. The machine learning model that is employed by the system manager 312 may be configured to detect such bursts in traffic ahead of time, enabling the system manager 312 to respond in advance by changing the configuration of the storage system.

In some implementations, the system manager 312 may be configured to perform the process 700, which is discussed further below with respect to FIGS. 7-9. As is discussed further below, the process 700 integrates modern snapshot technology with capabilities for the generation of APRs, which are subsequently used to train a machine learning model whose output is utilized to proactively configure (or tune) the operation of the storage system 108. With this said, it will be understood that the functions ascribed to the system manager 312 are provided as an example only, and the present disclosure is not limited to any specific function or set of functions that are performed by the system manager.

FIG. 3B is a schematic diagram of the system manager 312 in accordance with one particular implementation. As illustrated, the system manager may include a snapshot generator 352, a pattern recorder 354, a trend predictor 356, and a system configurator 358. Although in the example of FIG. 3B the snapshot generator 352, the pattern recorder 354, the trend predictor 356, and the system configurator 358 are depicted as separate blocks, it will be understood that two or more of them can be integrated. Furthermore, although in the example of FIG. 3B the snapshot generator 352, the pattern recorder 354, the trend predictor 356, and the system configurator 358 are implemented as one or more software processes, it will be understood that alternative implementations are possible in which any of the snapshot generator 352, the pattern recorder 354, the trend predictor 356, and the system configurator 358 is implemented in hardware or as a combination of hardware and software.

The snapshot generator 352 may be arranged to generate a sequence of snapshots of a set of storage objects. The set of storage objects may include only one storage object or a plurality of storage objects. Any of the storage objects in the set may include a system volume and/or any other suitable type of storage object. Each of the snapshots may represent the state of the set of storage objects at a different time instant.

The pattern recorder 354 may be arranged to generate a sequence of access pattern records (APRs) that are associated with the set of storage objects. Each of the APRs may be associated (e.g., linked) with a different one of the snapshots that are generated by the snapshot generator 32.

The trend predictor 356 may be arranged to implement a machine learning model for predicting the expected workload on the storage system with respect to the set of storage objects. The model may include any suitable type of model, such as a hidden Markov model, an AutoRegressive Integrated Moving Average (ARIMA) model, or a grammar-based model. The machine learning model may be trained based on the sequence of APRs that is generated by the pattern recorder 354. Training the machine learning model based on the sequence of APRs may enable the trend predictor 356 to yield more accurate predictions with respect to the set of storage objects because the APRs represent usage data that is: (i) specific to the set of storage objects, and (ii) specific to the customer(s) that are using the storage objects.

The system configurator 358 may include one or more processes that are arranged to reconfigure the storage system 108 based on a workload trend provided by the trend predictor 356. When the workload trend indicates that the workload (with respect to the set of storage objects) is set to increase, the system configurator 358 may increase the amount of resources that are available for servicing access requests for the set of storage objects. By contrast, when the workload trend provided by the trend predictor 356 indicates that the workload (with respect to the set of storage objects) is set to decrease, the system configurator 358 may decrease the amount of resources that are available for servicing access requests to the set of storage objects.

According to the present disclosure, the "phrase workload with respect to a set of storage objects" refers to the workload that is placed on a storage system 108 by access requests for the set of storage objects. By way of example, an access request for a storage object may include a read request that aims to retrieve data from the storage object, a write request that aims to store data in the storage object, or any other suitable type of requests that causes data (or metadata) to be retrieved and/or written to the storage object.

Figures 3C, 3D:
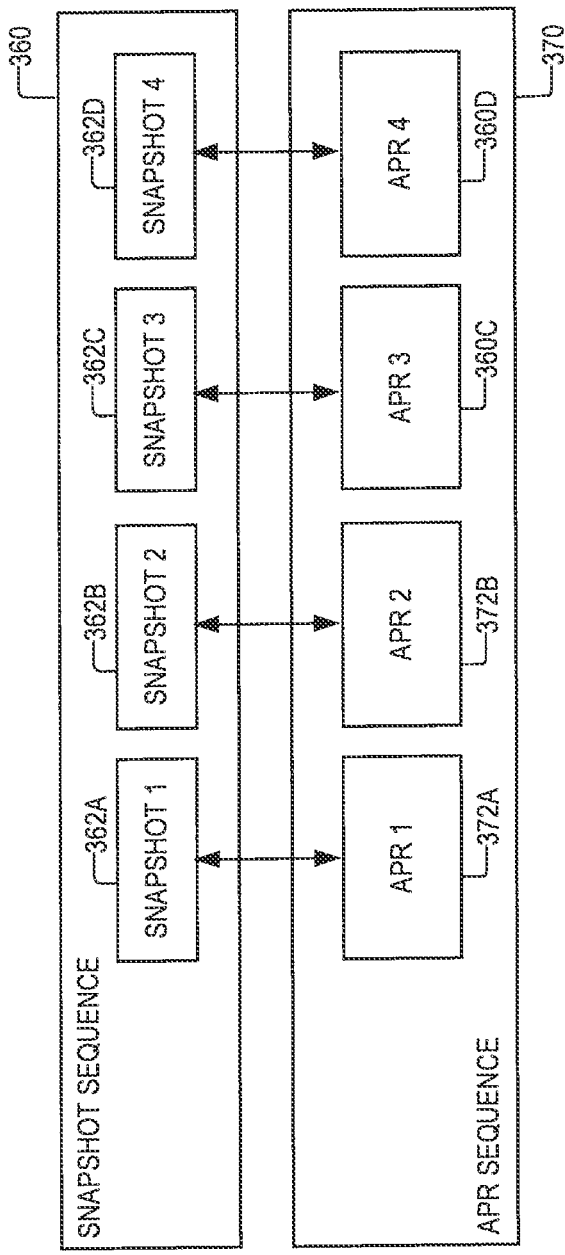
FIG. 3C is a diagram illustrating an example of a snapshot sequence and corresponding sequence of access pattern records (APRs) that is generated by the system manager of FIG. 3B.
FIG. 3D is a diagram illustrating an example of an APR, that is part of the APR sequence of FIG. 3D.

FIG. 3C is a diagram illustrating an example of a snapshot sequence 360 and an APR sequence 370. The snapshot sequence 360 may be generated by the snapshot generator 352. The APR sequence 370 may be generated by the pattern recorder 354. The snapshot sequence 360 may include a plurality of snapshots 362 for the set of one or more storage objects. Each of the snapshots 362 may be generated at a different time instant. The snapshots 362 may be arranged in sequence 360 in the order in which they are generated. The APR sequence 370 may include a plurality of APRs 372. Each of the APRs 372 may be generated at a different time instant, concurrently with one of the snapshots 362. The APRs 372 may be arranged in the APR sequence 370 in the order in which they are generated. Each APR 372 in the APR sequence 370 may be linked to a different snapshot 362, as shown.

The present disclosure is not limited to any specific method for linking the snapshots 362 to the APRs 372. In some implementations, a given APR 372 may be linked to a given snapshot 362 when the given APR 372 includes an identifier corresponding to the given snapshot 362. Additionally or alternatively, in some implementations, a given APR 372 may be linked to a given snapshot 362 when the given snapshot 362 includes an identifier corresponding to the given APR 372. Additionally or alternatively, in some implementations, a given APR 372 may be linked to a given snapshot 362 when a data structure is stored in the memory 320 of the management system 220 that maps the given snapshot 362 to the given APR 372. Additionally or alternatively, in some implementations, a given APR 372 may be linked to a given snapshot 362 when the given snapshot 362 and the given APR 372 are encapsulated in the same data structure. For example, the given snapshot 362 and the given APR 372 may be encapsulated in the same data structure when the given APR 372 is integrated into the given snapshot 362. As another example, the given snapshot 362 and the given APR 372 may be encapsulated in the same data structure when the given snapshot 362 is integrated into the given APR 372. As another example, the given snapshot 362 and the given APR 372 may be encapsulated in the same data structure when the given snapshot 362 and the given APR 372 are both encapsulated in the same data structure.

Each APR 372 may identify (directly or indirectly) a characteristic of workload that is experienced by the storage system 108 with respect to the set of storage objects. The characteristic of the workload that is placed on a storage system with respect to a set of storage objects may include the rate at which access requests for the storage object arrive at the storage system, the amount of data that is written (or retrieved) by the access requests, a total number of access requests for the set of storage objects that are received at the storage system during a particular period, and/or the value of another metric that characterizes the strain placed on the storage system 10$ by access requests for the storage objects.

Each APR 372 may identify a characteristic of workload that is experienced by the storage system 108 in a period preceding the generation of the APR's 372 linked snapshot. In the example of the FIG. 3C, the APR 372A is linked to the snapshot 362A, and it identifies a characteristic of workload that is experienced by the storage system 108 in a period preceding the generation of the snapshot 362A. The APR 372B is linked to the snapshot 362B, and it identifies a characteristic of workload that is experienced by the storage system 108 in a period starting when the snapshot 362A is generated and ending when the snapshot 362B is generated. The APR 372C is linked to the snapshot 362C, and it identifies a characteristic of workload that is experienced by the storage system 108 in a period starting when the snapshot 362B is generated and ending when the snapshot 362C is generated. The APR 372D is linked to the snapshot 362D, and it identifies a characteristic of workload that is experienced by the storage system 108 in a period starting When the snapshot 362C is generated and ending when the snapshot 362D is generated.

According to the example of FIG. 3C, the APR 372A is generated directly before the APR 372B, the APR 372B is generated directly before the APR 372C, and the APR 372C is generated directly before the APR 372C. In some aspects, a first APR may be considered to be generated directly before a second APR, when there are no intervening APRs that are generated after the first APR and before the second APR. Similarly, a first APR may be considered to be generated directly after a second APR, when there are no intervening APR that are generated before the first APR and after the second APR. As is further discussed below, when one of the snapshots 362 is deleted, the deleted snapshot's 362 linked APR 372 may be merged with another APR 372 that is generated either directly before or directly after the linked APR 372, FIG. 3D shows an example of one possible implementation of the APR 372s. Shoe in FIG. 3D is an example of an APR 372 that is implemented as a data structure including a plurality of access requests. Each signature may correspond to a different access request that is received at the storage system 108 before the APR's linked snapshot 362 to is generated. The data structure containing the signatures may include any suitable type of data structure, such as an SSTable or an LSMTree. For example, when the APR 372A is implemented using the configuration shown in FIG. 3D, the APR 372A may include a different respective signature 382 for each (or at least some) of the access requests for the set of storage objects that are received at the storage system 100 before the snapshot 362A is generated. Any signature 382 for a given access request may include an ID of the data stream that is used to fulfill the given request, an address associated with the given request, the length of the block that is associated with the given request, a type of the given request (e.g., read or write), a timestamp indicating when the given request was received (not shown), a timestamp indicating when the request was completed, and an indication whether the access request resulted in a cache hit When the APR 372B is implemented using the configuration shown in FIG. 3D, the APR 372B may include a different respective signature for each (or at least some) of the access requests for the set of storage objects that are received at the storage system 100 after the snapshot 362A is generated and before the snapshot 362B is generated. When the APR 372C is implemented using the configuration shown in FIG. 3D, the APR 372C may include a different respective signature for each (or at least some) of the access requests for the set of storage objects that are received at the storage system 100 after the snapshot 362B is generated and before the snapshot 362C is generated. When the APR 37213 is implemented using the configuration shown in FIG. 3D, the APR 372D may include a different respective signature for each (or at least some) of the access requests for the set of storage objects that are received at the storage system 100 after the snapshot 362C is generated and before the snapshot 362D is generated.

FIG. 3D shows an example in which the APRs 372 are implemented as logs of access requests. Such logs can be used to derive metric that characterizes the strain placed on the storage system 108 by access requests for the storage objects. For this reason, the APR implementation shown in FIG. 3D is said to identify indirectly characteristics of workload that is placed on the storage system 108 with respect to the storage objects. However, alternative implementations are possible in which the APRs 372 directly identify characteristics of workload that is placed on the storage system 108 with respect to the storage objects. In such instances, the APRs 372 may include any number, string, or alphanumerical string that indicates the rate at which access requests for the storage object arrive at the storage system, the amount of data that is written (or retrieved) by the access requests, a total number of access requests for the set of storage objects that are received at the storage system during a particular period, and/or the value of another metric that characterizes the strain placed on the storage system 108 by access requests for the storage objects.

According to aspects of the disclosure, the APR sequence 370 may be used to supplement information that is present in the snapshot sequence 360. As noted above, each snapshot 362 in the snapshot sequence 360 represents a different state of a set of storage objects in the storage system 108. On the other hand, each APR 372 (except for the first one), may identify a characteristic of workload experienced by the storage system 108, with respect to the set of storage objects, in a period preceding the generation of the APR's 372 linked snapshot. In this regard, while the snapshots 362 identify different states of the set of storage objects, the APRs 372 describe (or otherwise identify) the access patterns that were driving the change from one state to another.

According to aspects of the disclosure, the APRs 372 may be managed by using (with some modifications) mechanisms for version control of snapshots that are already present in many data storage systems. More particularly, the generation of the APR sequence 370 may be performed concurrently with the generation of the snapshot sequence 360. The APRs 372 may be generated by monitoring the data streams that deliver data in and out of the set of storage objects, and recording any access requests that are associated with the data streams. When a triggering event is detected within the storage system 108 that triggers the generation of a snapshot, in addition to the generation of one of the snapshots 362, the event may also trigger the generation of the APR 372 which is to be linked to the snapshot. Moreover, when the snapshots 362 are replicated to the storage system 120, the APRs 372 may be replicated with them. Put simply, the nature of the snapshots 362 is such that they can be managed using a modified version of mechanisms for snapshot management that are already in place in data storage systems. This in turn allows logic for generating APRs to be integrated into the data storage systems without a major redesign of their architectures.

The APR sequence 370 may be used to improve the operation of the storage system 108 in at least several ways. For example, the APR sequence 37 may be used to train the trend predictor 356. Because the APR sequence 370 identifies characteristics of a workload that has been experienced by the data storage system over the course of its normal operation, using the APR sequence 370 to train the trend predictor 356 may result in the trend predictor 356 yielding more accurate predictions than when an artificial data set is used. Furthermore, a portion of the APR sequence 370 along with the snapshot sequence 360 may be used to qualitatively test the accuracy of any workload prediction model that is trained using another portion of the APR sequence 370, which can be useful during the development and testing stages of the lifecycle of the storage system 108.

As another example, one or more APRs 372 in the APR sequence 370 may be used in to "warm up" the storage system in the event of a failover, when the storage system is restored to a prior state based on a given one of the snapshots 362. In such instances, a given APR 372 that is linked to the given snapshot 362 and/or one or more APRs 372 that are generated subsequently to the given APR 372 may be used to identify data associated with one or more access requests and prefetch this data in cache. In some implementations, the identified data may be associated with access requests that were received at the storage system 108 after the given APR 372 is generated. Additionally or alternatively, in some implementations, the identified data may be associated with access requests that were received at the storage system 108 after the given APR 372 is generated, and which have resulted in cache misses.

As yet another example, one or more APRs 372 in the APR sequence 370 may be used to provide visualizations of various aspects of the operation of the storage system 108. The visualizations may include graphs, text, and/or any other suitable type of medium. In some implementations, the visualizations may be based on differences between different APRs 372. For example, the visualizations may show how a workload characteristic of the set of objects changes over time. Such visualizations may be used by system administrators to better asses the state of the storage system 108.

Figure 4:
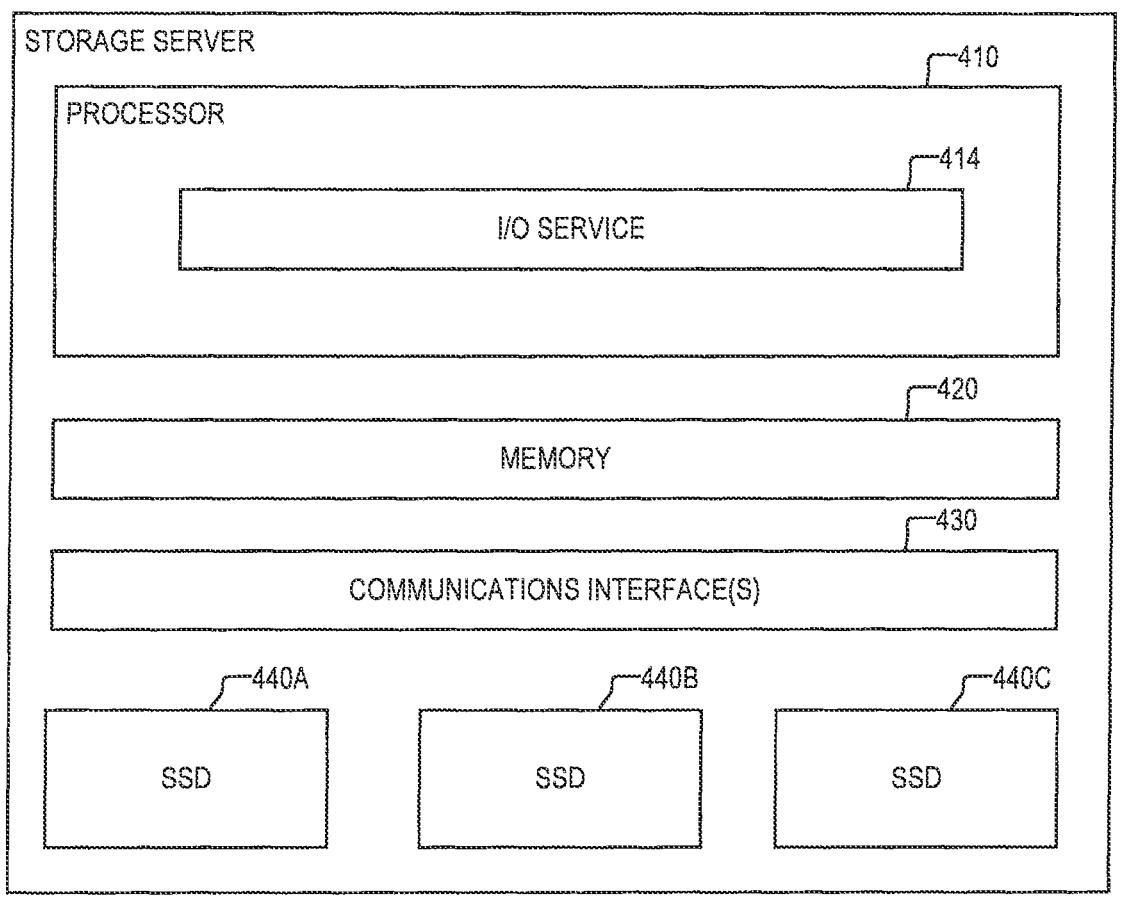
FIG. 4 is a diagram of an example of a storage server that is part of the source side storage system of FIG. 2, according to aspects of the disclosure.

FIG. 4 is a diagram of an example of the storage server 210A, according to aspects of the disclosure. As illustrated, the storage server 210 may include a processor 410, a memory 420, a communications interface(s) 430, and a plurality of storage devices that are operatively coupled to one another. The processor 410 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 420 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 430 may include any suitable type of communications interface, such as one or more Ethernet adapters, one or more Wi-Fi adapters (e.g., 802.141.4 adapters), and one or more Long-Term Evolution (LTE) adapters, for example. The storage devices 440 may be configured to form at least a portion of the LU 108. In the present example, the storage devices 440 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory, Although FIG. 4 is presented in the context of the storage server 210A, it will be understood that any other storage server in the storage array 108 has the same or similar configuration as the storage server 210A. Moreover, it will be understood that further implementations are possible in which at least two of the storage servers 210 have different hardware configurations. Stated succinctly, the present disclosure is not limited to any specific configuration for any of the storage servers 210.

Figure 5:
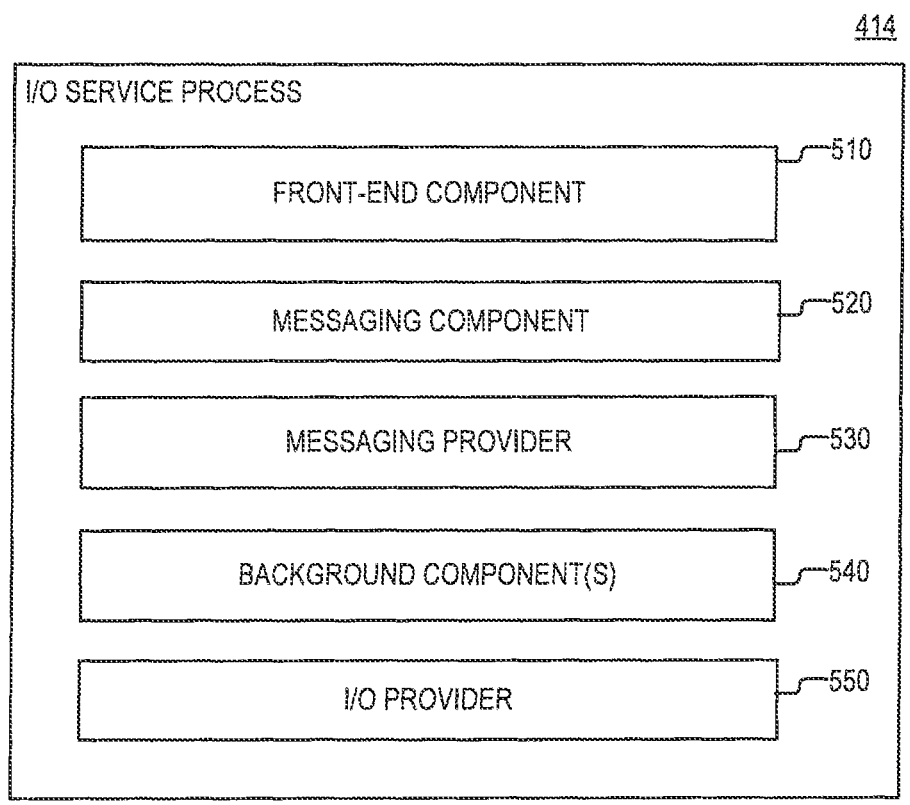
FIG. 5 is a diagram of an 110 service process that is executed by the storage server of FIG. 4, according to aspects of the disclosure.

FIG. 5 is a diagram of the I/O service process 414, which is executed on the processor 410 of the storage server 210A. As illustrated, the I/O service process 414 may include a frontend component 510, a messaging component 520, the messaging provider 530, the background component(s) 540, and I/O provider(s) 550. The frontend component 510 may be configured to pull I/O requests from an I/O pool for execution by the I/(provider(s) 550. The messaging component 520 may include any suitable type of software component that is configured to send and receive messages from storage servers 210, other than the storage server on which the messaging component 520 is executed. The messaging provider 530 may be configured to poll the messaging component 520 for received messages and/or process the received messages. The background component(s) 540 may include one or more components configured to perform background functions that are normally found in storage systems, such as defragmentation, and RAID rebuild, etc.

The I/O provider(s) 550 may include one or more 110 providers that are executed on the processor 410. Each of the I/O providers may he configured execute incoming I/O requests that incident on the storage system 100, the storage server 210A, and/or the 110 service process 414. In some implementations, each I/O provider may be arranged to fully execute incoming 110 requests. Alternatively, in some implementations, each I/O provider may be configured to partially execute an I/O request by implementing a particular stage of an 110 request fulfillment pipeline. Stated succinctly, the present disclosure is not limited to any specific implementation of the I/O provider(s) 550.

In the present example, each of the frontend component 510, the messaging component 520, the messaging provider 530, the background component(s) 540, and the I/O provider(s) 550 is implemented as a separate thread that is instantiated by and executed within the user space of the I/O service process 414. However, alternative implementations are possible in which any of the frontend component 510, the messaging component 520, the messaging provider 530, the background component(s) 540, and the I/O provider(s) 550 is executed outside of the user space of the I/O service process 414. For the purposes of the present disclosure, the terms "process" and "thread" may be used interchangeably to refer to a sequence of processor-executable instructions that can be managed independently by a scheduler that is part of an operating system and/or another type of scheduler that is itself managed by the operating system scheduler.

Figure 6:
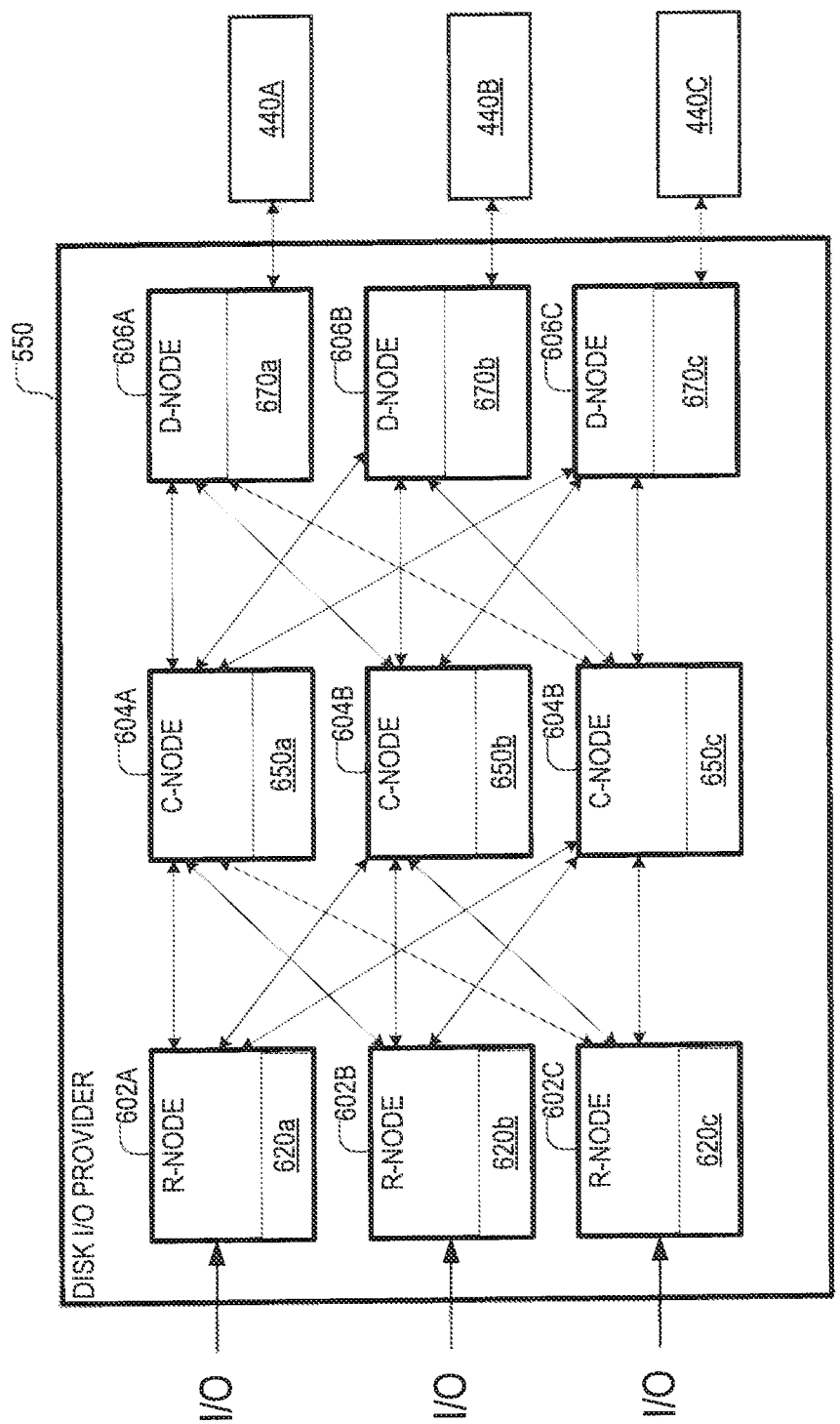
FIG. 6 is a diagram of an example of a disk I/O provider that is executed within the 110 service process of FIG. 5, according to aspects of the disclosure.

FIG. 6 is diagram illustrating an example of one particular implementation of the I/O provider(s) 550. According to the present example, the I/O provider(s) 550 includes I/O providers 602, 604, and 606, which are herein referred to as routing nodes, control nodes, and data nodes respectively.

The routing nodes 602 may be configured to terminate 110 requests received at the storage system 100 and route them to appropriate control nodes 604 and data nodes 606 for further execution. In doing so, the routing nodes 602 may distribute a workload over multiple control nodes 604 and data nodes 606. In some implementations, any of the routing nodes 602 may be configured to write I/O requests (e.g., SCSI I/O requests) to selected ones of the control nodes 604 for further processing. In some implementations, each of the routing nodes 602 may be provided with a respective address-to-control-module (A2C) table 620 that identifies a plurality of control nodes (e.g, the control nodes 604) and a different respective LDA range that is managed by each of the control nodes. In this regard, the A2C table 620 may define a plurality of logical spaces that are managed by different control nodes 604. In the present example, a copy of the A2C table 620 is stored on each of the routing nodes 602. However, it will be understood that the present disclosure is not limited to any specific method for allocating respective logical spaces to the control nodes 604.

The control nodes 604 may be configured to control the execution of control node commands supplied by the routing nodes 602. The control node commands may be used to implement read requests, write requests, and/or any other suitable I/O request. In addition, each of the control nodes 604 may maintain and manage key metadata elements. Each of the control nodes 604 may be configured to receive control node commands from the routing nodes and communicate with the data nodes 606 to execute the commands. In some implementations, each control node 604 may maintain an address-to- data node table (H2D) table 650 that identifies a plurality of data nodes and a different respective hash digest range that is associated with each of the data nodes. In this regard, the H2D table may effectively define a plurality of logical spaces that are managed by different data nodes 606. In the present example, a copy of the H2D table is stored on each of the control nodes 604.

The data nodes 606 may be configured to control the execution of data node commands supplied by the control nodes 604. Each of the data nodes 606 may be attached to one or more of the storage devices 440. Each of the data nodes may store in memory a hash-to-physical-address (H2P) table 670. The H2P table 670 may identify a plurality of physical addresses in the storage devices 440, and different respective hash digest that is mapped to each of the physical addresses. In this regard, the H2P table 670 may be used to map hash digests received from the control nodes to different physical locations in the volumes 160 managed by the data nodes 606. In the present example, each of the data nodes 606 includes a different table H2P table 670 that is specific to that data node.

In operation, any of the routing nodes 602 may receive an I/O request that spans a range of logical data addresses (LDAs). The request may include a block of data and an opcode identifying an action that is required to be performed. In response to the request, the routing node 602 may use its respective A2C table to identify a plurality of control nodes 604 based on the A2C table. Afterwards, the routing node 602 may decompose the I/O request into a plurality of control node commands and forward the control node commands to the identified control nodes 604 for further processing.

In operation, any of the control nodes 604 may receive a control node command that is generated by one of the routing nodes 602. The control node command may include a data payload and an opcode identifying an action that is required to be performed. Upon receiving the control node command, the control node 604 may decompose the control node command into a plurality of data node commands and forward each of the data node commands. In some implementations, each of the data node commands may include a different page of data along with a hash digest of the page. Each data node command may then be forwarded to a respective data node 606 that is selected based on the H2D table 650 and the data node command's hash digest (i.e., the data node responsible for managing the range of hash digests which the data node command's respective hash digest falls into).

In operation, any of the data nodes 606 may receive a data node command that is generated by one of the control nodes 604. Next, the data node 606 may search its respective H2P table to identify a physical address in one of the storage devices 440 that corresponds to the hash digest that is contained in the data node command. Afterwards, the data node 606 may store the payload of the data node command (i.e., the page of data contained in the data node command) at the identified physical address.

Figure 7:
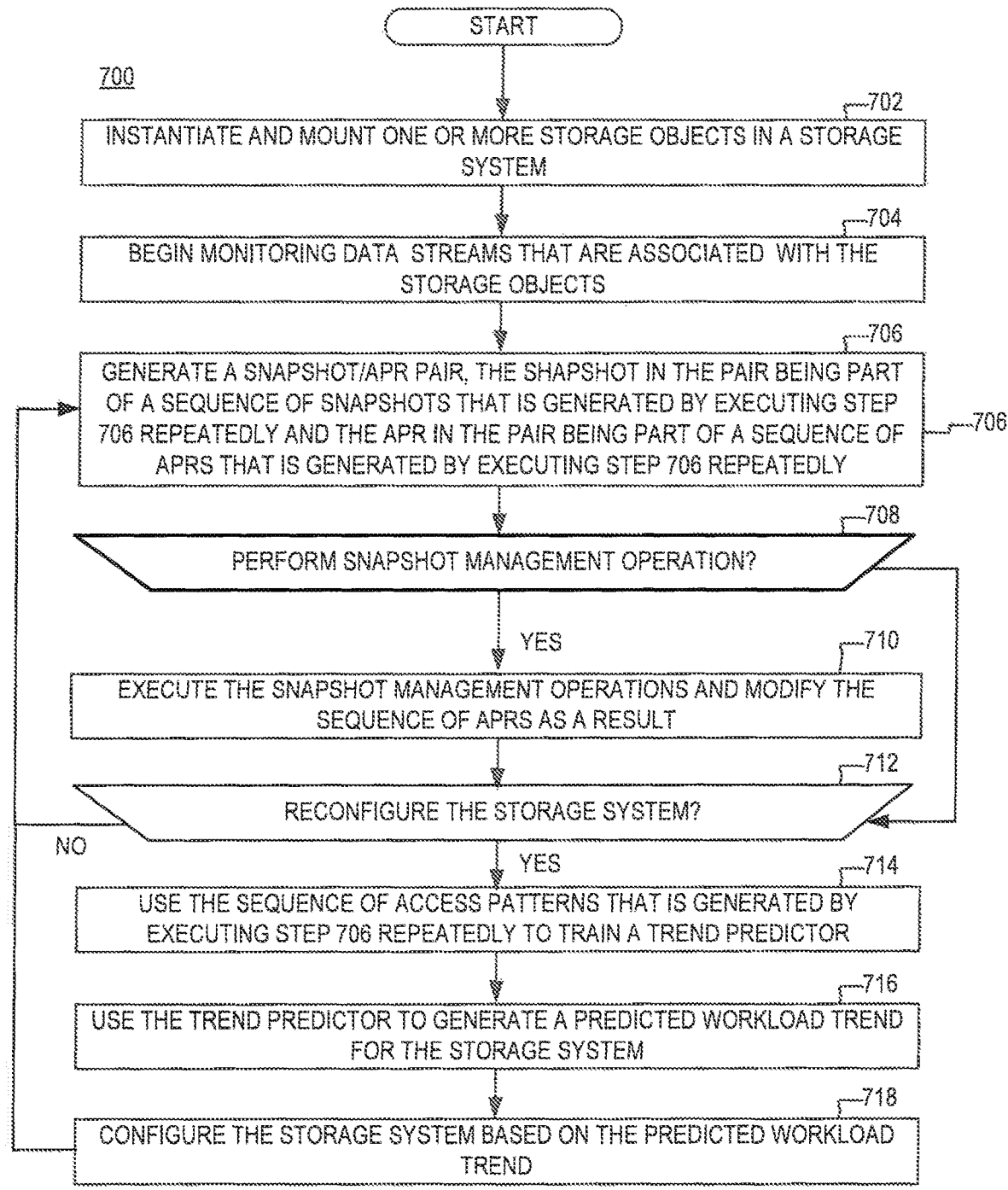
FIG. 7 is a flowchart of an example of a process, according to aspects of the disclosure.

FIG. 7 is a flowchart of an example of a process 700 for configuring a storage system, according to aspects of the disclosure.

At step 702, one or more storage objects are instantiated and mounted in the storage system. Any of the instantiated storage objects may include a storage volume and/or any other suitable type of storage object. In some implementations, the storage system may be the same or similar to the storage system 108.

At step 704, one or more data streams that are associated with the one or more storage objects are identified and begin to he monitored. Any of the identified data streams may include an I/O stream that is used to write or read data from the one or more storage objects and/or any other suitable type of data stream. Monitoring the data streams may include detecting what access requests are executed using the data streams and recording various characteristics of the access requests. As noted above with respect to FIG. 3D, the recorded characteristics for any of the access requests may include an ID of the data stream that is used to fulfill the request, an address associated with the request, the length of the block that is associated with the request, a type of the request (e,g, read or write), a timestamp indicating when the request was received, a timestamp indicating when the request was completed, and an indication of whether the access request resulted in a cache hit. The present disclosure is not limited to any specific type of characteristics being recorded.

At step 706, a snapshot and an APR associated with the snapshot are generated. The snapshot may include any suitable object or data structure that represents the state of the one or more objects instantiated at step 702 at a particular time instant. The APR may indicate a characteristic of workload experienced by the storage system with respect to the one or more storage objects instantiated at step 702 in a period preceding the generation of the snapshot (e.g., a period starting when step 706 was executed the last time and ending with the current execution of step 706). The APR may be the same or similar to the APRs 372, which is discussed with respect to FIGS. 3B-D. The snapshot may be part of a sequence of snapshots that is generated by repeatedly executing step 706. The sequence of snapshots may be the same or similar to the snapshot sequence 360, which is discussed with respect to FIGS. 3B-D. The APR may be part of a sequence of APRs that is generated by repeatedly executing step 706. The sequence of APRs may be the same or similar to the APR sequence 370, which is discussed with respect to FIGS. 3B-D. The manner in which step 706 is performed is discussed further below with respect to FIG. 8.

At step 708, a determination is made whether to perform a snapshot management operation. In some implementations, making the determination may include detecting whether a predetermined event (e.g., an interrupt, etc.) has been generated within the storage system. If a snapshot management operation is to be performed, the process 700 proceeds to step 710. Otherwise, the process 700 proceeds to step 712.

At step 710, a snapshot management operation is executed, and the sequence of APRs is modified as a result. The manner in which step 710 is performed is discussed further below with respect to FIG. 9.

At step 712, a determination is made whether to reconfigure the storage system. In some implementations, making the determination may include detecting whether a predetermined event (e.g., an interrupt, etc.) has been generated within the storage system. If the storage system is to be reconfigured, the process 700 proceeds to step 714. Otherwise, the process 700 returns to step 706.

At step 714, a trend predictor is trained using the sequence of APRs. The trend predictor may implement a machine learning model for calculating a workload trend for the storage system during a predetermined future period. The workload trend provided by the trend predictor may identify a characteristic of the workload which the storage system is expected to experience during a future period with respect to the one or more storage objects that are instantiated in step 702. For example, the workload trend may include any number, string, or alphanumerical string that identifies one or more of: (i) the average rate at which access requests for the one or more storage objects are expected to arrive at the storage system during the future period, (ii) the amount of data that is expected to be written to the one or more storage objects (e.g., GB) during the future period, (iii) the rate at which the data is expected to be written to the one or more storage objects (e.g., MB/s) during the future period, (iv) the amount of data that is expected to be read from the one or more storage objects (e.g., GB) during the future period, (v) the rate at which the data is expected to be read from the one or more storage objects (e.g., MB/s) during the future period, or (vi) the value of any suitable metric that characterizes the strain placed on the storage system by access requests for the one or more storage objects instantiated in step 702. The future period may have any suitable duration. For example, the future period may be 1-hour long, one-day long, one-week long, one-month long, etc.

The machine learning model may be any suitable type of model that is arranged to generate the value of a first characteristic of workload which the storage system is expected to experience with respect to the one or more storage objects instantiated in step 702 during a future period based on the past values of one or more second characteristics of workload that the storage system has already experienced with respect to the one or more storage objects instantiated at step 702. The first characteristics may be the same type as the second characteristic or a different type. In some implementations, the machine learning model may include a bidden Markov model, an ARIMA model, a grammar-based model, and/or any other suitable type of machine learning model. The present disclosure is not limited to any specific machine learning model for predicting future workload trends based on the information found in the APRs.

At step 716, the workload predictor is executed to generate a workload trend for a predetermined period in the future. The generated trend may be a stable trend, a rising trend, and a falling trend. According to aspects of the disclosure, a rising workload trend may be a workload trend that indicates that the workload on the storage system with respect to the one or more storage objects instantiated in step 702 will increase; a falling workload trend may be a workload trend that indicates that the workload on the storage system with respect to the one or more storage objects instantiated in step 702 will decrease; and a stable workload trend may be a workload trend that indicates that the workload on the storage system with respect to the one or more storage objects instantiated in step 702 will remain approximately the same.

At step 718, the storage system is configured based on the workload trend that is generated by the workload predictor. When the workload trend is a rising workload trend, configuring the storage system may include instituting one or more system policies that would help the storage system to complete access requests without their latency falling below a certain performance constraint. Such policies may include reducing the priority at which one or more processes are scheduled to free up processor time for other processes that are more critical with respect to the latency at which access requests for the one or more storage objects are completed (e.g., processes that execute the access requests). As another example, such policies may include redistributing one or more address tables in order to spread out workload more evenly among storage system nodes. Such tables may include any of the tables 620, 650, and 670, which are discussed above with respect to FIG. 6. As yet another example, the policies may include making more network bandwidth available for servicing access requests for the one or more storage objects.

When the workload trend is a falling workload trend, configuring the storage system may include instituting one or more system policies that would free up system resources that would become underutilized when the workload on the storage system with respect to the one or more storage object is decreased. Such policies may include increasing the priority at which one or more processes that perform background services, reducing the priority of processes that execute access requests of the one or more storage objects, or reducing the amount of network bandwidth that is reserved for servicing access requests for the storage objects. Additionally or alternatively, in some implementations, when the workload trend is stable, no changes may be made to the configuration of the storage system. After step 718 is completed, the process 700 returns to step 706. Steps 706-718 may be repeated until the one or more storage objects instantiated in step 702 are unmounted or until another type of event occurs.

Figure 8:
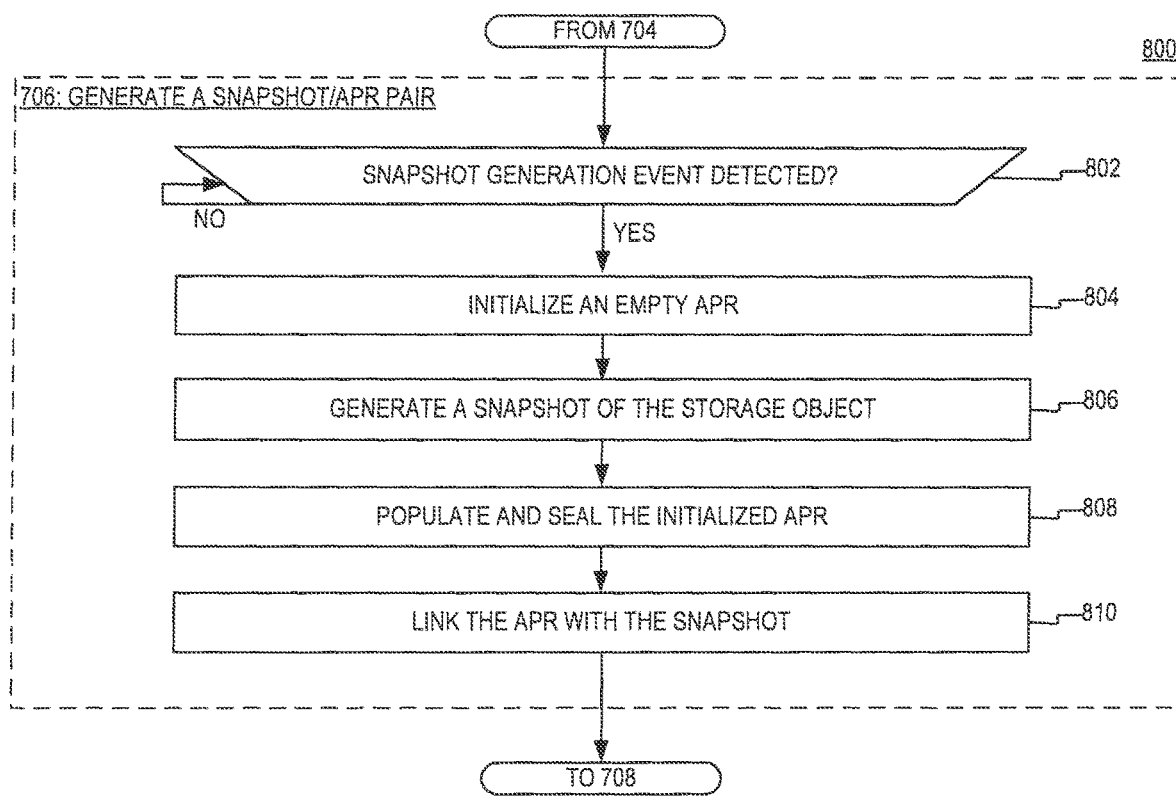
FIG. 8 is a flowchart of an example of a sub-process associated with the process of FIG. 7, according to aspects of the disclosure.

FIG. 8 is a diagram of an example of a process 800 for generating a snapshot/APR pair, as specified by step 706 of the process 700. According to the process 800, the generation of snapshots is performed concurrently with the generation of the APRs that are linked to the snapshots. Moreover, according to the process 800, the generation of the APRs may be driven by the same system event as the generation of the snapshots.

At step 802, a determination is made if a snapshot generation event is detected. The snapshot event may be any suitable type of event (e.g., interrupt) that is arranged to cause the storage system to generate a snapshot of the one or more storage objects that are instantiated in step 702.

At step 804, an empty APR is initialized. In some implementations, initializing the empty APR may include instantiating a data structure that is arranged to hold one or more access request signatures, such as the signatures 382. The present disclosure is not limited to any specific type of data structure being used. However, in some implementations, the data structure may be one that is designed to append and/or merge well. In such instances, the data structure may be an SSTable or an LSMTree.

At step 806, in response to the snapshot generation event, a snapshot of the one or more storage objects is generated. In some implementations, generating the snapshot may include pausing the servicing of access requests to the one or more storage objects, waiting for in-flight access requests to complete, recording an indication of the current state of the one or more storage object objects after the in-flight access requests have completed, storing the indication as the snapshot, and resuming the servicing of access requests for the one or more storage objects.

At step 808, in response to the snapshot generation event, the empty APR initialized at step 804 is populated with a plurality of signatures associated with access requests that have arrived since the generation of the previous APR (if there is a previous APR) and before the generation of the snapshot event. Each of the signatures may correspond to a different access request for the one or more storage objects instantiated in step 702. In some implementations, the signatures may be generated in real-time (or near-real-time), as access requests for the one or more storage objects arrive at the storage system. When the signatures are generated, they may be initially stored in a temporary buffer. Afterwards, when the snapshot generation event is detected, the signatures may be transferred from the temporary buffer into the empty APR that is instantiated at step 804. After the transfer of the signatures into the APR, the APR may be sealed to become read-only (e.g, the access permissions of the APR may be changed). In some implementations, the generated APR may be the same or similar to the APRs 372 that are discussed with respect to FIGS. 3C-D.

Although in the example of FIG. 8, the APR is generated by storing access request signatures in a temporary buffer and transferring the access request signatures from the temporary buffer into the empty APR, alternative implementations are possible in which the access request signatures are possible in which the APR is generated in a different manner. In such implementations, the access request signatures may be processed to calculate one or more characteristics of workload experienced by the storage system with respect to the one or more storage objects that are instantiated at step 702, and the calculated characteristics may be stored into the empty APR instead of (or in addition to) the access request signatures.

At step 810, the generated snapshot is linked to the generated APR The present disclosure is not limited to any specific manner of linking the snapshot to the APR. In some implementations, the snapshot may be linked in the manner discussed above with respect to FIG. 3C.

Figure 9:
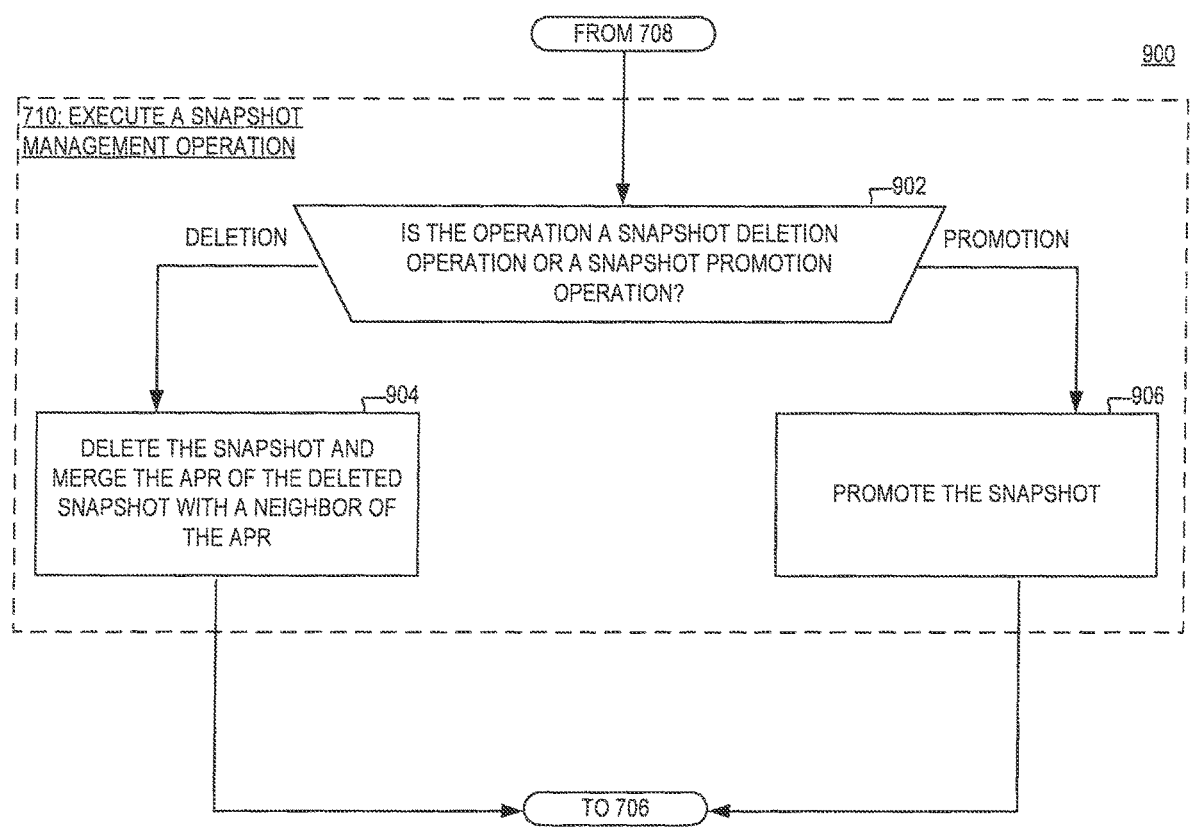
FIG. 9 is a flowchart of an example of a sub-process associated with the process of FIG. 7, according to aspects of the disclosure.

FIG. 9 is a diagram of an example of a process 800 for executing a snapshot management operation, as specified by step 710 of the process 700. According to the process 900, the snapshot management operations, such as deletion or promotion, are integrated with corresponding APR management operations.

At step 902, a determination is made if the snapshot management operation is either a deletion operation or a promotion operation. If the snapshot management operation is a deletion operation, the process 900 proceeds to step 904. Otherwise, if the snapshot management operation is a promotion operation, the process 900 proceeds to step 906.

At step 904, the snapshot is deleted, and a first APR that is linked to the deleted snapshot is merged with one of its neighbors. More particularly, in response to the snapshot delete event, the storage system may: (i) identify the first APR that is linked to the deleted snapshot, (ii) identify a second APR that is generated either directly before or directly after the first APR, (iii) retrieve some or all signatures that are contained in the first APR, and (iv) append the retrieved signatures into the data structure which constitutes the second APR. In some implementations, when the second APR is generated directly after first APR, the contents of the first APR may be appended to the beginning of the first APR. In some implementations, when the second APR is generated directly before the first APR, the contents of the first APR may be appended to the end of the first APR. In some implementations, instead of appending any of the retrieved signatures, the storage system may combine the retrieved signature with one of the signatures in the second APR. For example, if the first APR includes a first signature corresponding to a read request for blocks 1-n and the second APR includes a second read request for blocks [n+1]-m, the storage system may: (i) generate a third signature corresponding to a read request for blocks 1-m, (ii) delete the second signature from the second APR, and (iii) insert the third signature in the second APR at the place of the second signature.

At step 906, the snapshot is promoted and the process 900 returns to step 706, where a new snapshot/APR pair is generated in the manner discussed above with respect to FIG. 8.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
generating a plurality of snapshots, each of the snapshots representing a state of one or more storage objects in a storage system;
generating a plurality of access pattern records (APRs) for the storage objects, each APR being associated with a different respective one of the plurality of snapshots, each APR indicating a characteristic of workload of the storage system in a period preceding the generation of the APR's associated snapshot, the plurality of snapshots identifying different respective states of the storage objects, and the plurality of APRs identifying access patterns that are driving transitions between the respective states of the storage objects;
detecting a workload trend for the storage objects, the workload trend being detected by using a workload prediction model that is trained based on the plurality of APRs; and
configuring the storage system based on the workload trend, the configuring including allocating additional resources for servicing access requests to the storage objects when the workload trend is a rising workload trend,
wherein the generation of the plurality of APRs is synchronized with the generation of the plurality of snapshots, such that any of the plurality of snapshots and the snapshot's associated APR are generated in response to the same snapshot generation event, and the snapshot's associated APR is populated with one or more signatures that are generated before the snapshot, each of the one or more signatures corresponding to a respective access request that is received at the storage system.

2. The method of claim 1, wherein:
the workload trend indicates a rate at which access requests to the storage objects are expected to arrive at the storage system, and
the workload trend is a rising trend when the workload trend indicates that the rate will increase in the future.

3. The method of claim 1, further comprising:
deleting a first one of the plurality of snapshots; and
merging: (i) a first one of the plurality of APRs that is associated with a first one of the plurality of snapshots with a (ii) second one of the plurality of APRs that is associated with a second one of the plurality of snapshots, the second snapshot being a neighbor of the first snapshot,
wherein the deleting of the first one of the plurality of snapshots and the merging of the first APR with the second APR are driven by the same system event.

4. The method of claim 1, further comprising:
promoting a one of the plurality of snapshots; and
generating an additional APR indicating a characteristic of workload of the storage system in a period ending when the snapshot is promoted.

5. The method of claim 1, wherein any of the APRs includes a plurality of access request signatures, each access request signature corresponding to a different access request to the storage objects that is received at the storage system during a period preceding the generating of the APR's associated snapshot, each access request signature including a timestamp corresponding to the signature's corresponding access request.

6. The method of claim 1, wherein associating any given one of the plurality of APRs with a given one of the plurality of snapshots includes at least one of:
including, in the given APR, an identifier corresponding to the given snapshot,
including, in the given snapshot, an identifier corresponding to the given APR,
encapsulating the given APR and the given snapshot in the same data structure, and
mapping the given APR to the given snapshot by using a data structure that is separate from the given APR and the given snapshot.

7. A system comprising:
a memory; and
at least one processor operatively coupled to the memory, the at least one processor being configured to perform the operations of:

generating a plurality of snapshots, each of the snapshots representing a state of one or more storage objects in a storage system;

generating a plurality of access pattern records (APRs) for the storage objects, each APR being associated with a different respective one of the plurality of snapshots, each APR indicating a characteristic of workload of the storage system in a period preceding the generation of the APR's associated snapshot, the plurality of snapshots identifying different respective states of the storage objects, and the plurality of APRs identifying access patterns that are driving transitions between the respective states of the storage objects;

detecting a workload trend for the storage objects, the workload trend being detected by using a workload prediction model that is trained based on the plurality of APRs;

and configuring the storage system based on the workload trend, the configuring including allocating additional resources for servicing access requests to the storage objects when the workload trend is a rising workload trend, wherein the generation of the plurality of APRs is synchronized with the generation of the plurality of snapshots, such that any of the plurality of snapshots and the snapshot's associated APR are generated in response to the same snapshot generation event, and the snapshot's associated APR is populated with one or more signatures that are generated before the snapshot, each of the one or more signatures corresponding to a respective access request that is received at the storage system.

8. The system of claim 7, wherein:
the workload trend indicates a rate at which access requests to the storage objects are expected to arrive at the storage system, and
the workload trend is a rising trend when the workload trend indicates that the rate will increase in the future.

9. The system of claim 7, wherein the at least one processor is further configured to perform the operations of:
deleting a first one of the plurality of snapshots; and
merging: (i) a first one of the plurality of APRs that is associated with a first one of the plurality of snapshots with (ii) a second one of the plurality of APRs that is associated with a second one of the plurality of snapshots, the second snapshot being a neighbor of the first snapshot,
wherein the deleting of the first one of the plurality of snapshots and the merging of the first APR with the second APR are driven by the same system event.

10. The system of claim 7, wherein the at least one processor is further configured to perform the operations of:
promoting a one of the plurality of snapshots; and
generating an additional APR indicating a characteristic of workload of the storage system in a period ending when the snapshot is promoted.

11. The system of claim 7, wherein any of the APRs includes a plurality of access request signatures, each access request signature corresponding to a different access request to the storage objects that is received at the storage system during a period preceding the generating of the APR's associated snapshot, each access request signature including a timestamp corresponding to the signature's corresponding access request.

12. The system of claim 7, wherein associating any given one of the plurality of APRs with a given one of the plurality of snapshots includes at least one of:

including, in the given APR, an identifier corresponding to the given snapshot,
including, in the given snapshot, an identifier corresponding to the given APR,
encapsulating the given APR and the given snapshot in the same data structure, and
mapping the given APR to the given snapshot by using a data structure that is separate from the given APR and the given snapshot.

13. A non-transitory computer-readable medium storing one or more processor-executable instructions, which when executed by at least one processor cause the at least one processor to perform the operations of:

generating a plurality of snapshots, each of the snapshots representing a state of one or more storage objects in a storage system;

generating a plurality of access pattern records (APRs) for the storage objects, each APR being associated with a different respective one of the plurality of snapshots, each APR indicating a characteristic of workload of the storage system in a period preceding the generation of the APR's associated snapshot, the plurality of snapshots identifying different respective states of the storage objects, the plurality of APRs identifying access patterns that are driving transitions between the respective states of the storage objects;

detecting a workload trend for the storage objects, the workload trend being detected by using a workload prediction model that is trained based on the plurality of APRs; and configuring the storage system based on the workload trend, the configuring including allocating additional resources for servicing access requests to the storage objects when the workload trend is a rising workload trend, wherein the generation of the plurality of APRs is synchronized with the generation of the plurality of snapshots, such that any of the plurality of snapshots and the snapshot's associated APR are generated in response to the same snapshot generation event, and the snapshot's associated APR is populated with one or more event signatures that are generated before the snapshot, each of the one or more signatures corresponding to respective access request that is received at the storage system.

14. The non-transitory computer-readable medium of claim 13, wherein:
the workload trend indicates a rate at which access requests to the storage objects are expected to arrive at the storage system, and
the workload trend is a rising trend when the workload trend indicates that the rate will increase in the future.

15. The non-transitory computer-readable medium of claim 13, wherein the processor-executable instructions, when executed by the at least one processor, further cause the at least one processor to perform the operations of:
deleting a first one of the plurality of snapshots; and
merging: (i) a first one of the plurality of APRs that is associated with a first one of the plurality of snapshots with (ii) a second one of the plurality of APRs that is associated with a second one of the plurality of snapshots, the second snapshot being a neighbor of the first snapshot,
wherein the deleting of the first one of the plurality of snapshots and the merging of the first APR with the second APR are driven by the same system event.

16. The non-transitory computer-readable medium of claim 13, wherein the processor-executable instructions, when executed by the at least one processor, further cause the at least one processor to perform the operations of:
promoting a one of the plurality of snapshots; and
generating an additional APR indicating a characteristic of workload of the storage system in a period ending when the snapshot is promoted.

17. The non-transitory computer readable medium of claim 13, wherein any of the APRs includes a plurality of access request signatures, each access request signature corresponding to a different access request to the storage objects that is received at the storage system during a period preceding the generating of the APR's associated snapshot, each access request signature including a timestamp corresponding to the signature's corresponding access request.

* * * * *